United States Patent
Hill

[11] 3,854,512
[45] Dec. 17, 1974

[54] METHOD OF CUTTING FLAT SHEETS INTO STRIPS

[75] Inventor: Harvey J. Hill, Monterey Park, Calif.

[73] Assignee: Roberts Consolidated Industries, Inc., City of Industry, Calif.

[22] Filed: June 11, 1973

[21] Appl. No.: 368,740

[52] U.S. Cl. .................. 144/326 R, 144/323, 225/3, 225/96.5
[51] Int. Cl. ............................................. B27c 9/00
[58] Field of Search ............. 144/136 R, 41, 39, 37, 144/323, 321, 312, 326 R; 225/2, 3, 4, 5, 96.5

[56] References Cited
UNITED STATES PATENTS

| | | | |
|---|---|---|---|
| 1,720,841 | 7/1929 | Jones | 144/326 R X |
| 2,053,375 | 9/1936 | Nicholas | 225/3 X |
| 2,110,728 | 3/1938 | Hoggatt | 144/326 R |
| 2,369,221 | 2/1945 | Donsheath | 225/3 |
| 2,609,049 | 9/1952 | Rayburn | 225/3 X |
| 3,490,503 | 1/1970 | Hill et al. | 144/323 |
| 3,731,861 | 5/1973 | Busch | 225/96.5 X |

*Primary Examiner*—Andrew R. Juhasz
*Assistant Examiner*—W. D. Bray
*Attorney, Agent, or Firm*—Harris, Kern, Wallen & Tinsley

[57] ABSTRACT

A method of cutting into strips of uniform width a flat plywood sheet having more than two plies and having spaced, parallel, first and second sides, including the steps of: sawing in the first side of the sheet parallel first grooves which are uniformly spaced apart in a direction parallel to the planes of the sides of the sheet and which extend into an interior ply of the sheet; sawing in the second side of the sheet parallel second grooves which are uniformly spaced apart in the direction mentioned the same distance as the first grooves, and which are paired with and are slightly spaced from the first grooves, respectively, in such direction to provide pairs of slightly offset first and second grooves, the combined depths of the first and second grooves of each pair being at least equal to the thickness of the sheet, thereby dividing the sheet into strips of the same widths breakable from each other in zones respectively interconnecting the first and second grooves of the pairs; and breaking each of the strips from the adjacent strip by applying adjacent the free edge of the strip to be broken off a force generally perpendicular to the planes of the sides of the sheet and acting along the entire length of such free edge, the groove which extends along the supported edge of the strip to be broken off, and which is on the side of the sheet opposite the side to which the breaking force is applied, closing to pivot the strip to be broken off relative to the adjacent strip, thereby insuring breaking off of the strip to which the breaking force is applied.

5 Claims, 5 Drawing Figures

METHOD OF CUTTING FLAT SHEETS INTO STRIPS

BACKGROUND OF INVENTION

The invention relates in general to a method of cutting flat sheets into strips, preferably of the same width. The invention is particularly applicable to cutting plywood sheets into strips for use as carpet gripper strips, and will be considered in such connection herein for convenience. It will be understood, however, that the invention is applicable to cutting flat sheets of other materials into strips for other purposes.

The type of carpet gripper strip to which the invention especially relates is disclosed in detail in my U.S. Pat. No. 3,353,204, issued Nov. 21, 1967. That patent disclosed a strip having along its outer edge an upper overhang under which a raw carpet edge can be tucked and having along its inner edge a lower ledge serving as a cutting surface for a knife used to trim the padding used under the carpeting. The present invention relates specifically to an improved method of cutting a flat sheet into carpet gripper strips having this configuration.

U.S. Pat. No. 3,490,503, issued Jan. 20, 1970 to Paul H. Heinzel and me, discloses a method and apparatus for cutting a flat plywood sheet into strips having the configuration of U.S. Pat. No. 3,353,204. The later patent mentioned discloses a method which requires four basic steps. First, opposite sides of the flat sheet are provided with pairs of shallow relief grooves by sawing, with the grooves of each pair on opposite sides of the sheet being slightly offset in the direction of the planes of the sides of the sheet. Secondly, rotary shearing blades deepen the initial grooves, the combined depths of the cuts of each pair being at least nearly equal to the thickness of the sheet. The first two steps divide the sheet into strips breakable from each other in zones respectively interconnecting the first and second grooves of the various pairs.

The third step of the method of U.S. Pat. No. 3,490,503 involves breaking the strips apart by applying to each strip a force progressing from one end of the strip toward the other and acting perpendicularly to the planes of the sides of the original sheet, which caused the strip to separate from the adjacent strip unevenly. Consequently, a fourth step was required, viz., smoothing the rough surfaces resulting from the breaking step. This resulted in considerable loss of material from the inner ply in which the breaking took place, thereby weakening the upper overhang and lower ledge mentioned above in connection with U.S. Pat. No. 3,353,204, a serious disadvantage.

Another disadvantage of the method and apparatus of U.S. Pat. No. 3,490,503 is that the rotary shearing blades required the application thereto of substantial forces, in a direction perpendicular to the planes of the sides of the sheet, to achieve penetration to the required depths. Such forces imposed severe loads on the shafts carrying the rotary shearing blades, and on the frame of the apparatus. The end result was uneven depths of cut across the width of the sheet, something obviously undesirable. Furthermore, the rotary blades tended to follow the grains of the outer plies, which normally are not parallel to the edges of the sheet. The result was lateral forces tending to shift or skew the sheet, which forces were tremendous if the outer ply grains were more or less parallel, but inclined to the desired lines of cut.

In addition, the process and apparatus of U.S. Pat. No. 3,490,503 necessitated considerable twisting of the individual strips during breaking, which was detrimental to inferior interply adhesion, a not uncommon defect of plywood sheets.

OBJECTS AND SUMMARY OF INVENTION

The primary object of the invention is to provide a method of cutting flat sheets, and particularly plywood sheets, into strips which avoids the foregoing and various other disadvantages of the prior art, while still producing carpet gripper strips having the desirable attributes disclosed in U.S. Pat. No. 3,353,204.

More particularly, an important object of the invention is to provide a method of subdividing a flat sheet into strips which requires only two basic steps and which results in broken surfaces along the edges of the strips which are smooth enough to render the strips usable as carpet gripper strips without any final trimming operations, and consequent weakening of the overhang and ledge mentioned.

More particularly, an important object of the invention is to form the pairs of laterally offset grooves in the opposite sides ov the flat sheet in a way which does not require the application of high pressures to the sides of the sheet in a direction perpendicular to the planes of the sides of the sheet and which avoids lateral forces on the sheet due to grain direction.

The foregoing result is preferably achieved by, and a basic object of the invention is to provide a method which involves, sawing parallel first and second grooves in the first and second sides of the sheet with the second grooves slightly spaced from the respective first grooves in a direction perpendicular to the direction of the grooves, thereby forming paired grooves in opposite sides of the sheet with the grooves of each pair slightly offset relative to each other laterally of the grooves. The first and second grooves of each pair have a total depth at least nearly equal to the thickness of the sheet, and preferably equal to the sheet thickness, although the total depth may slightly exceed the sheet thickness to provide a slight overlap.

An important feature of the foregoing sawing operation is that the groove depths can be controlled very closely without the imposition of large forces perpendicular to the planes of the side of the sheet since saw blades, and particularly high speed rotary saw blades, require the imposition of only very small forces in a direction perpendicular to the planes of the sides of the sheet.

Each strip into which the sheet is subdivided by the pairs of opposed, sawed grooves is broken from the adjacent strip in a zone interconnecting the "bottoms" of the first and second grooves of the pair in question, as in the aforementioned U.S. Pat. No. 3,490,503.

However, an important object of the present invention resides in breaking each strip from the adjacent strip in such a way as to minimize the formation of rough surfaces in the breakage zone, and to minimize any possibility of separation of inadequately adhered plies.

More particularly, a basic object of the invention is to break each strip from the adjacent one by imparting a rotary or pivotal motion to the strip to be broken off, throughout the entire length of such strip. More particularly, a basic object of the invention is to break each strip from the adjacent strip by applying adjacent the free edge of the strip to be broken off a force generally perpendicular to the planes of the sides of the sheet and preferably acting along the entire length of the free edge of the strip being broken off. In some instances, however, the breaking force need not be continuous along the entire length of the free edge, and may even be progressive lengthwise, even though this does result in some twisting of the strip being broken off.

An important feature of the invention in breaking each strip from the strip thereadjacent is that the groove which extends along the supported edge of the strip to be broken off, and which is on the side of the sheet opposite the side to which the breaking force is applied, closes so as to provide a pivot requiring the strip to be broken off to rotate relative to the adjacent strip, thereby insuring separation of such strip from the adjacent strip with a minimum of roughening of the strip surfaces in the breakage zone and with a minimum tendency to delaminate the plies of a plywood sheet in the breakage zone.

The invention may be summarized as including, and an important object is to provide a method of cutting a flat sheet into strips of uniform width which includes the steps of: sawing in the first side of the sheet parallel first grooves which are uniformly spaced apart in a direction parallel to the planes of the sides of the sheet; sawing in the second side of the sheet parallel second grooves which are uniformly spaced apart in the direction mentioned the same distance as the first grooves, and which are paired with and are slightly spaced from the first grooves, respectively, in such direction to provide pairs of slightly offset first and second grooves, the combined depths of the first and second grooves of each pair being at least nearly equal to the thickness of the sheet, and preferably at least equal to the thickness thereof, thereby dividing the sheet into strips of the same width breakable from each other in zones respectively interconnecting the first and second grooves of the pairs; and, finally, breaking each strip from the adjacent strip by applying adjacent the free edge of the strip to be broken off a force generally perpendicular to the planes of the sides of the sheet and acting along the entire length of such free edge. Applying the breaking force adjacent the free edge of the strip to be broken off achieves maximum leverage, which is an important feature.

As previously mentioned, as each strip is broken off, the groove on the side opposite the applied force closes to provide a pivot requiring rotary motion of the strip being separated, which rotary motion results in the pulling of the fibers of an intermediate ply of a plywood sheet in a direction parallel to their normal direction so as to shear the intermediate ply relatively cleanly to provide surfaces requiring no subsequent trimming.

The foregoing objects, advantages, features and results of the present invention, together with various other objects, advantages, features and results thereof which will be evident to those skilled in the art in the light of this disclosure, may be achieved with the exemplary embodiment of the invention illustrated in the accompanying drawing and described in detail hereinafter.

DESCRIPTION OF EXEMPLARY EMBODIMENT OF INVENTION

Figure 1:
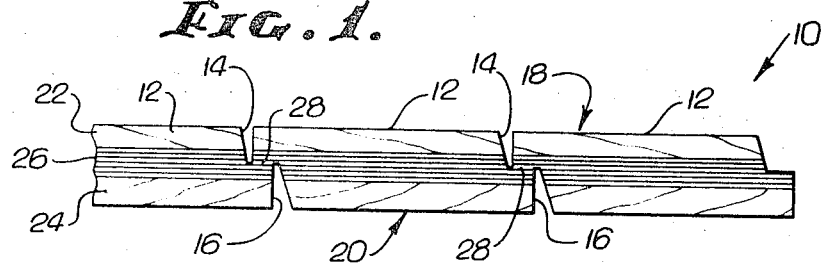
FIG. 1 is a fragmentary transverse sectional view of a three-ply plywood sheet which has been sawed on both sides in accordance with the invention.

Referring initially to FIG. 1 of the drawing, illustrated therein is a three-ply plywood sheet 10 which has been subdivided into strips 12, suitable for use as carpet gripper strips, by first and second sawed grooves 14 and 16 respectively formed in first and second sides 18 and 20 of the sheet. The cross-sectional configurations of the grooves 14 and 16 may vary from those illustrated, the latter being preferred, however.

The first grooves 14 are parallel and are uniformly spaced apart in a direction parallel to the planes of the sides 18 and 20 of the sheet 10. The second sawed grooves 16 are also parallel and unformly spaced apart in the same direction, by the same distance as the first grooves. Each first groove 14 is paired with a second groove 16 and is slightly spaced therefrom laterally of the direction of the grooves, thereby providing the grooves of each pair with a slight lateral offset.

The first and second grooves 14 and 16 extend through exterior plies 22 and 24 into an interior ply 26, and the combined depths of the first and second grooves of each pair are at least nearly equal to the thickness of the sheet 10, and preferably at least equal to the thickness. If desired, the combined depths of each pair of grooves 14 and 16 may slightly exceed the sheet thickness to provide a slight groove overlap.

As mentioned, the first and second grooves 14 and 16 are formed by sawing, and preferably by circular saws, not shown, thereby minimizing grooving forces in a direction perpendicular to the planes of the sides of the sheet 10 and insuring very accurate groove depth control, which is an important feature.

As will be apparent, the paired grooves 14 and 16 divide the sheet 10 into the strips 12 of the same width, the strips being breakable from each other in zones 28 interconnecting the "bottoms" of the first and second grooves of each pair.

After the sheet 10 has been subdivided into the strips 12 by sawing the grooves 14 and 16 therein in the manner herinbefore described, the strips are then broken apart, preferably one at a time, as shown in FIGS. 2 to 5 of the drawing. Initially, one edge of the sheet 10 is placed between guides 30 with a strip 12 to be broken off exposed, the guides holding the adjacent strip, or strips, in a manner preventing excessive rotation thereof.

The exposed strip 12 is broken from the adjacent strip by applying adjacent the free edge of the exposed strip a force 32 generally perpendicular to the planes of the sides of the sheet 10 and acting substantially along the entire length of such free edge. As an example, FIG. 5 suggests applying the force 32 with a paddle 34 of a rotary paddle wheel, not shown, rotating in the direction of the arrow 36, such paddle extending the entire length of the exposed strip 12 and engaging same adjacent its free edge. The purpose of applying the perpendicular force 32 adjacent the free edge of the exposed strip 12 to obtain maximum leverage. It will be understood that the force 32 may be applied in either direction, a downward application being shown in most of the figures as illustrative only.

Figure 2:
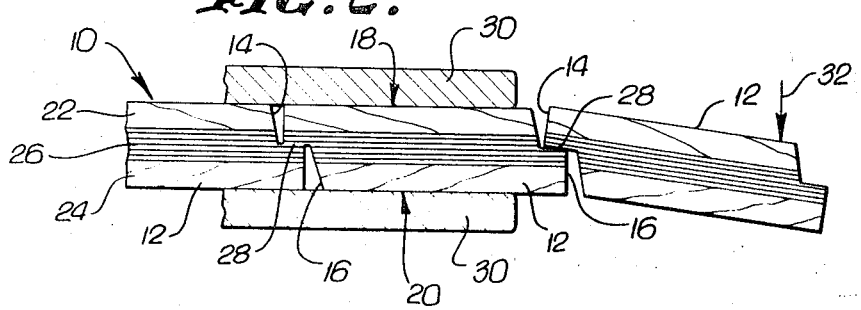
FIGS. 2, 3 and 4 are views similar to FIG. 1, but illustrating successive steps in the breaking off of a strip from an adjacent strip.

If the fibers of the interior ply 26 are all, or nearly all, aligned with the planes of the sides of the sheet 10 in the direction of the spacing of the strips 12, the perpendicular force 32 will separate the exposed strip from the adjacent strip with a relatively small input and with only a slight pivotal or rotary movement of the exposed strip. In other words, complete separation can occur with as little rotary or pivotal movement as is shown in FIG. 2, due to the leverage obtained by pivoting of the strip 12 about the right edge of the zone 28.

Figure 3:
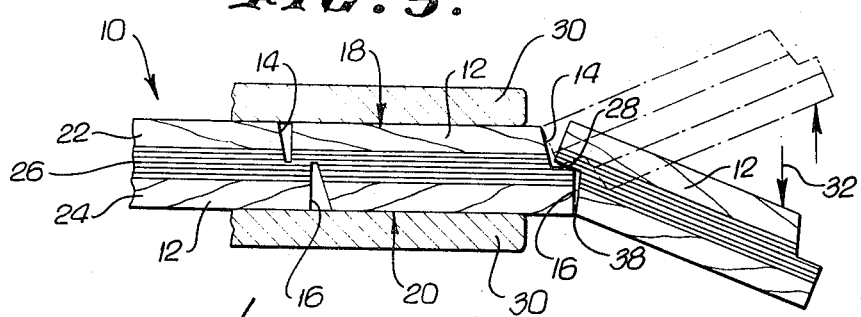
Figure 4:
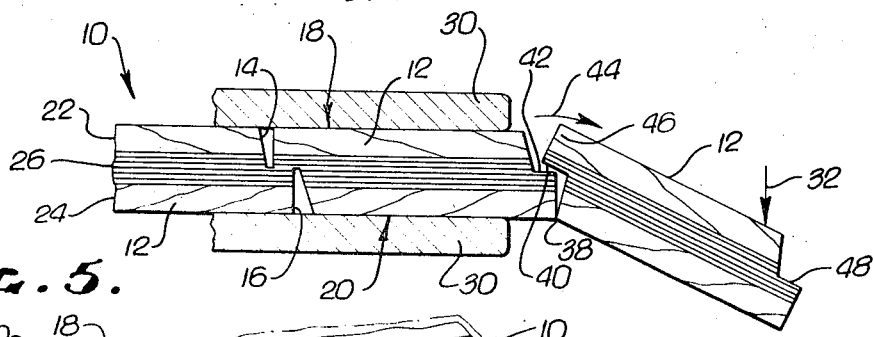
Figure 5:
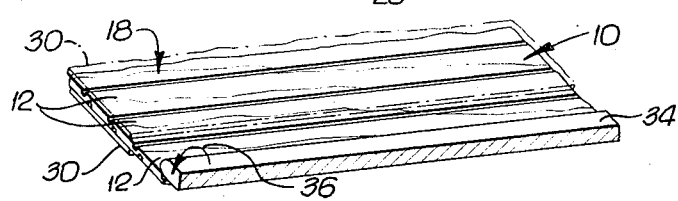
FIG. 5 is a fragmentary perspective view on a reduced scale suggesting an apparatus for carrying out the breaking step of FIGS. 2, 3 and 4 of the drawing.

Normally, however, at least some of the fibers are misaligned and will resist immediate separation of the exposed strip 12 from the adjacent strip, requiring further pivotal movement of the exposed strip. Ultimately, as shown in FIG. 3, the outer edge or "top" of the groove 16 will close, thereby providing at 38 a pivot axis extending along the full length of the strip 12 being broken off. Continued application of the force 32 causes the strip being broken off to pivot about the axis 38 until any fibers of the interior ply 26 which are still attached are ruptured, the final break being made with forces generally along the axis of the fibers so that the ultmate "broken" surfaces 40 and 42, FIG. 4, remain relatively smooth. As shown in broken lines in FIG. 3, the strip 12 to be broken off may be pivoted upwardly, toward the shallower groove 14. This improves leverage and normally results in a cleaner break.

In extreme cases, or with certain materials, the exposed strip 12 may be separated from the adjacent strip by alternately applying perpendicular forces in opposite directions, treating the exposed strip 12 in the same general fashion as a swinging door. However, when dealing with a material like plywood, separation of the exposed strip 12 from the adjacent strip occurs easily, and sometimes even before the groove 16 is closed to provide the pivot or hinge axis 38 about which the exposed strip pivots as indicated by the arrow 44.

Thus, the present invention involves only two basic steps, viz., sawing the sheet 10 to provide the grooves 14 and 16, and then breaking off each strip 12 from the adjacent strip by pivoting such strip relative to the remainder of the sheet 10, preferably simultaneously along the entire length of such strip. No pregrooving or final finishing steps are required, the broken surfaces 40 and 42 being sufficiently smooth for use of the strips 12 as carpet gripper strips, which are important features.

It will be noted that each separated strip 12 has the desirable basic configuration disclosed in the aforementioned U.S Pat. No. 3,353,204, in that it provides an overhang 46 under which a raw carpet edge may be tucked, and provides a ledge 48 for a padding trimming knife. It will be understood that this basic desirable configuration is achieved not only with the groove configurations 14 and 16 shown, but with various variations of such configurations which can be used.

Another important feature of the present invention is that very little of the sheet 10 of plywood is wasted as sawdust. Currently practiced methods of making carpet gripper strips out of plywood result in 48 strips from a sheet 48 inches wide. The present invention increases the number of strips obtainable from such a sheet to 54, without reducing the width of the strips. This means a net increase in the number of strips per sheet of 12½percent, a tremendous saving in plywood costs and a corresponding conservation of material, which are important features of the invention.

Although an exemplary embodiment of the invention has been disclosed for illustrative purposes, it will be understood that various changes, modifications and substitutions may be incorporated in this embodiment without departing from the invention as hereinafter claimed.

I claim:

1. A method of cutting into strips a flat sheet having spaced, paralle, first and second sides, including the steps of:

a. sawing in the first side of the sheet parallel first grooves which are uniformly spaced apart in a direction parallel to the planes of the sides of the sheet;

b. sawing in the second side of the sheet parallel second grooves which are uniformly spaced apart in said direction the same distance as said first grooves, and which are paired with and are slightly spaced from said first grooves, respectively, in said direction to provide pairs of slightly offset first and second grooves, the combined depths of said first and second grooves of each pair being at least equal to the thickness of the sheet, thereby dividing the sheet into strips of the same width breakable from each other in zones respectively interconnecting said first and second grooves of said pairs; and c. breaking each of said strips from the adjacent strip by applying adjacent the free edge of the strip to be broken off a force generally perpendicular to the planes of the sides of the sheet and acting along the entire length of said free edge.

2. A method according to claim 1 wherein the sheet is plywood having at least three plies, and wherein said first and second grooves are sawed into an interior ply of the sheet.

3. A method of cutting into strips a flat sheet having spaced, parallel, first and second sides, including the steps of:

a. sawing in the first side of the sheet parallel first grooves which are spaced apart in a direction parallel to the planes of the sides of the sheet;

b. sawing in the second side of the sheet parallel second grooves which are spaced apart in said direction, and which are paired with and are slightly spaced from said first grooves, respectively, in said direction to provide pairs of slightly offset first and second grooves, the combined depths of said first and second grooves of each pair being at least nearly equal to the thickness of the sheet, thereby dividing the sheet into strips breakable from each other in zones respectively interconnecting said first and second grooves of said pairs; and c. breaking each of said strips from the adjacent strip by applying to the strip to be broken off a breaking force generally perpendicular to the planes of the sides of the sheet and acting along substantially the entire length of the strip to be broken off.

4. A method according to claim 3 wherein the groove which extends along the supported edge of the strip to be broken off, and which is on the side of the sheet opposite the side to which said breaking force is applied, closes to pivot the strip to be broken off relative to the adjacent strip, thereby insuring breaking off of the strip to which said breaking force is applied.

5. A method of breaking into strips a flat sheet having spaced, parallel, first and second sides and having in the first side thereof parallel first grooves which are spaced apart in a direction parallel to the planes of the sides of the sheet, the second side of the sheet having therein parallel second grooves which are spaced apart in said direction, and which are paired with and are slightly spaced from said first grooves, respectively, in said direction to provide pairs of slightly offset first and second grooves, the combined depths of said first and second grooves of each pair being at least nearly equal to the thickness of the sheet, thereby dividing the sheet into strips breakable from each other in zones respectively interconnecting said first and second grooves of said pairs, said method including the step of:

a. breaking each of said strips from the adjacent strip by applying to the strip to be broken off a force generally perpendicular to the planes of the sides of the sheet and acting along substantially the entire length of the strip to be broken off.

* * * * *